United States Patent [19]

Zaslavsky et al.

[11] 4,098,089
[45] Jul. 4, 1978

[54] METHOD OF LAYING SUBSOIL MEMBRANES

[75] Inventors: Dan Zaslavsky; Gideon Sinai; Giora Biran, all of Haifa, Israel

[73] Assignee: Technion Research and Development Foundation, Ltd., Haifa, Israel

[21] Appl. No.: 734,174

[22] Filed: Oct. 20, 1976

[30] Foreign Application Priority Data

Oct. 20, 1975 [IL] Israel ............................. 48328

[51] Int. Cl.² ............................................. E02B 11/02
[52] U.S. Cl. .......................... 61/72.6; 61/11; 61/63
[58] Field of Search ................... 61/72.6, 105, 63, 11, 61/13; 47/9; 111/7 R

[56] References Cited

U.S. PATENT DOCUMENTS

| 3,309,875 | 3/1967 | Niederwemmer | 61/13 |
| 3,339,369 | 9/1967 | Ryan | 61/72.6 |
| 3,585,804 | 6/1971 | Sramek | 61/72.6 |
| 3,590,588 | 7/1971 | Draper et al. | 61/72.6 |

*Primary Examiner*—Jacob Shapiro
*Attorney, Agent, or Firm*—Browdy and Neimark

[57] ABSTRACT

A method for laying subsoil membranes includes dragging a hollow cutting blade through the soil at a predetermined depth, providing a supply of sheeting to the interior of the blade and feeding the sheeting from the interior of the blade through an opening therein. The hollow blade has a cutting edge, a rear edge and an upper section having an upwardly sloping front portion and a downwardly sloping rear portion connected by a center portion. The bottom portion of the blade slopes in an upward direction from its front to form a release angle. The sheet material is fed out of an opening in the rear of the blade.

23 Claims, 10 Drawing Figures

1

METHOD OF LAYING SUBSOIL MEMBRANES

BACKGROUND OF THE INVENTION

The invention relates to the separation of upper soil layers from the subsoil by laying a membrane of a preferably impervious material at a predetermined depth below the soil surface. This separation by underground films or membranes is done for various purposes: to produce impermeable ponds, dam levees or reservoirs for water or other liquids. Impermeable membranes are being used in the building of roads, runways, subgrades, sidewalks and road margins. More recently, impermeable membranes have been installed in agricultural fields at several decimeters below the surface with the purpose of reducing leakage of rain or irrigation water below the root zone and thus to increase the yield.

Several methods of preparing an impermeable underground layer are known. In one of these methods the soil is excavated to the necessary depth, the surface is smoothed and compacted and the impermeable layer is brought up on this surface by either laying prefabricated sheeting or by spraying a suitable plastic or liquid material. The excavated soil is then returned onto the top of the membrane. The drawbacks of this method are that the costs of smoothing and compacting after removal of the top layer are very high, that the thickness and strength of the membrane must be sufficient to sustain the stresses imposed on it by the heavy earth moving equipment used in replacing the previously removed soil, as otherwise there may be the danger of tearing, punctures and imperfect cover.

An improved method has been suggested wherein a subsoil blade is dragged through the soil parallel to the surface and simultaneously a suitable material is ejected and sprayed from the rear edge of this blade forming an impervious membrane after hardening. In this manner excavation and replacing of the soil, as well as manual or mechanical laying of a membrane are avoided and combined in one continuous operation. The main drawback of this method is the high cost of the material destined to form the membrane, since the requirement of producing a perfect continuous membrane demands the spraying of a relatively thick layer. As an example, the use of asphalt calls for a thickness of several millimeters. In addition, production of this type of membrane is limited to soils having no rough clods or aggregates and permit smooth penetration of the blade. It is also required that the soil is compatible with the sprayed material to allow perfect spraying and bonding.

SUMMARY OF THE INVENTION

It is therefore the object of the present invention to improve on the last-mentioned method by laying and inserting into the ground a prefabricated film or membrane of predetermined properties by means of special equipment suitable for laying this membrane without the need of a previous excavation. Furthermore, the use of this equipment should permit the laying of such membrane in other configurations than flat and in parallel to the soil surface.

Another object of the invention is to provide a method of laying a subsoil membrane which can utilize a membrane of a prefabricated material which can be produced to a wide range of properties thus allowing various applications. Still another object is to provide a method of laying a subsoil membrane which can utilize a membrane of a very thin and inexpensive plastic material in order to save costs.

The method consists of dragging a hollow cutting blade having a straight or otherwise formed cutting edge, an upwardly sloping front portion and a downwardly sloping rear portion ending at about the same height as the front edge, through the soil at a predetermined depth by means of a traction vehicle, providing for the supply of prefabricated thin, e.g. between 10 and 40 microns, sheeting of a pliable material to the interior of the blade and for the feeding of the said sheet material from the interior of the blade parallel to the rear edge thereof, at the velocity of the progress of the blade through the soil. The feeding is automatic in that the sheet material is held back by the soil falling onto its upper surface after having been raised by the passing blade.

In a preferred embodiment of the invention, the blade possesses a straight front edge and a straight hollow body of the said configuration, a flat bottom portion open at its rear, with a roll of the sheet material positioned rotatably in the blade interior in parallel to the front edge, the membrane being formed by the sheet material unrolling from the said roll through the said bottom opening into the cut made by the blade underneath the rear edge of the latter.

The method may also include the laying of pipes, cables or wires on top and adjacent to the sheet material forming the membrane by feeding these materials into the soil by any method known to the art.

DETAILED DESCRIPTION OF THE PREFERRED EMBODIMENTS

Figure 1:
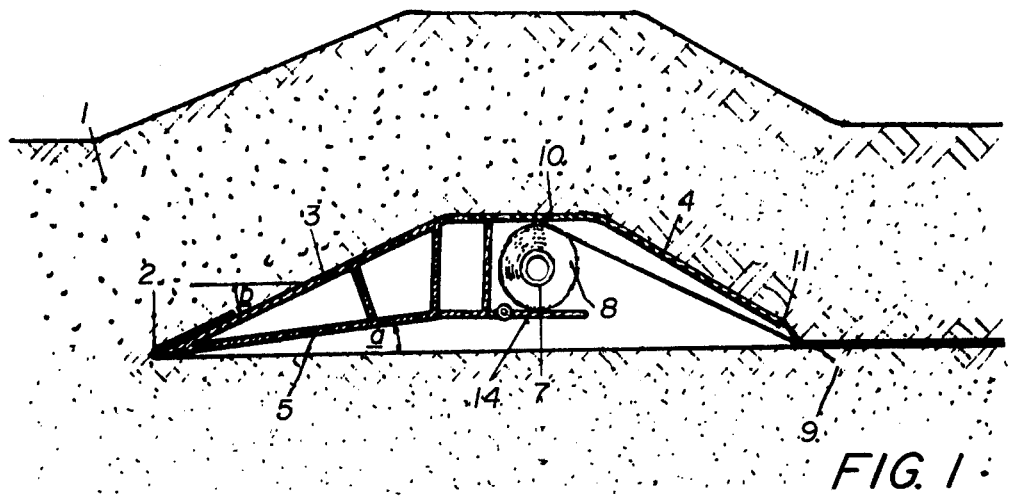
FIG. 1 illustrates a vertical cross-section through a hollow blade serving to carry out the method according to the invention.
Figure 2:
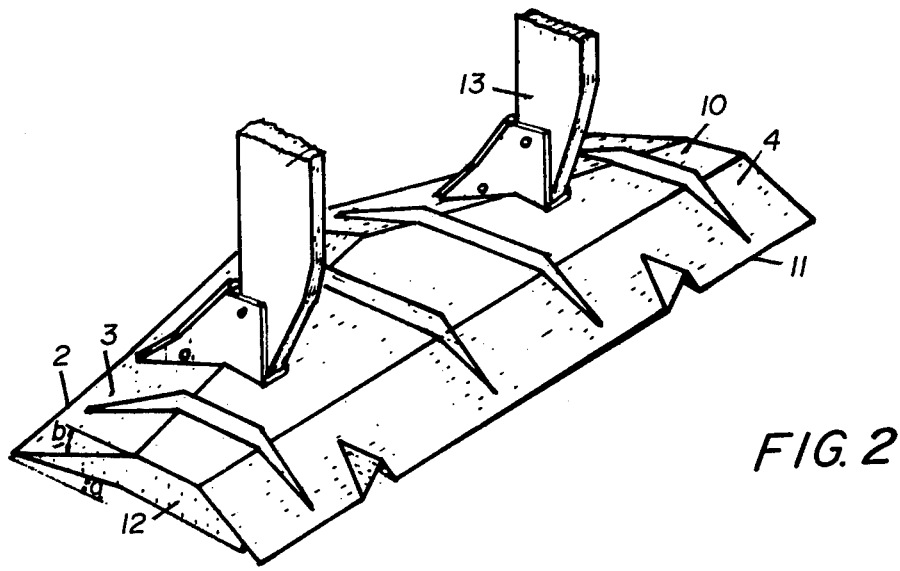
FIG. 2 is a perspective view of the blade illustrated in FIG. 1, showing attachment means to a traction vehicle.
Figure 3:
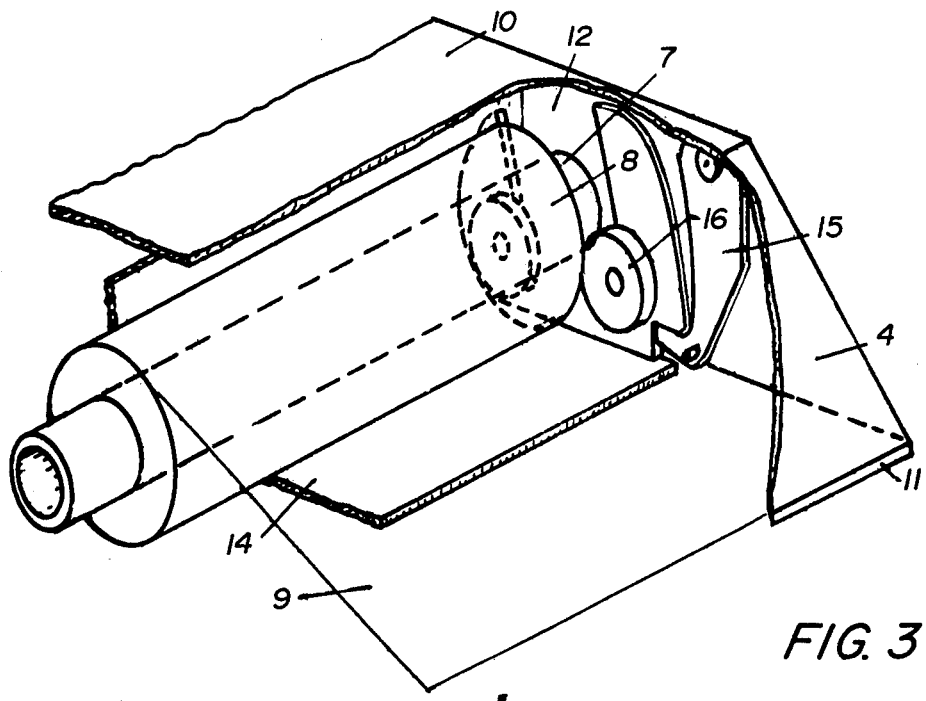
FIG. 3 is a perspective view of the interior of the blade illustrated in FIGS. 1 and 2.

Referring now to FIGS. 1, 2 and 3 of the drawings, the equipment for carrying out the operation includes a blade of the required width which is carried beneath a vehicle and is dragged through the soil 1 at a predetermined depth, with the front edge 2 cutting through the soil 1. Its bottom portion 5 form a release angle $a$ with the cut soil so as to prevent friction between the bottom of the blade and the soil surface. The top portion 3 of the blade is sloped in an upward direction at an angle $b$ for the purpose of pushing the soil above the blade, terminating in a substantially horizontal center portion 10. A rear portion 4 of the blade 3 is arranged at a rearward and downward slope with its rear edge 11 ending at a height slightly above the height of the front edge of the blade. Two side shields 12 close the hollow space formed between the top and the bottom of the blade. The blade is attached to a traction vehicle above ground by means of two substantially vertical arms or shanks 13 which are standard equipment with earthmoving equipment.

A hollow cylindrical support 7 carrying a roll 8 of a thin sheet material of a width commensurate with the width of the interior space is positioned within the space and carried at its ends on spaced rollers 16 attached to the end shields 12 permitting its free rotation about its axis. A free end 9 of the material is shown to have unrolled off the roll 8, and to be kept pressed between the stationary and the raised and replaced soil layers respectively.

Figure 4:
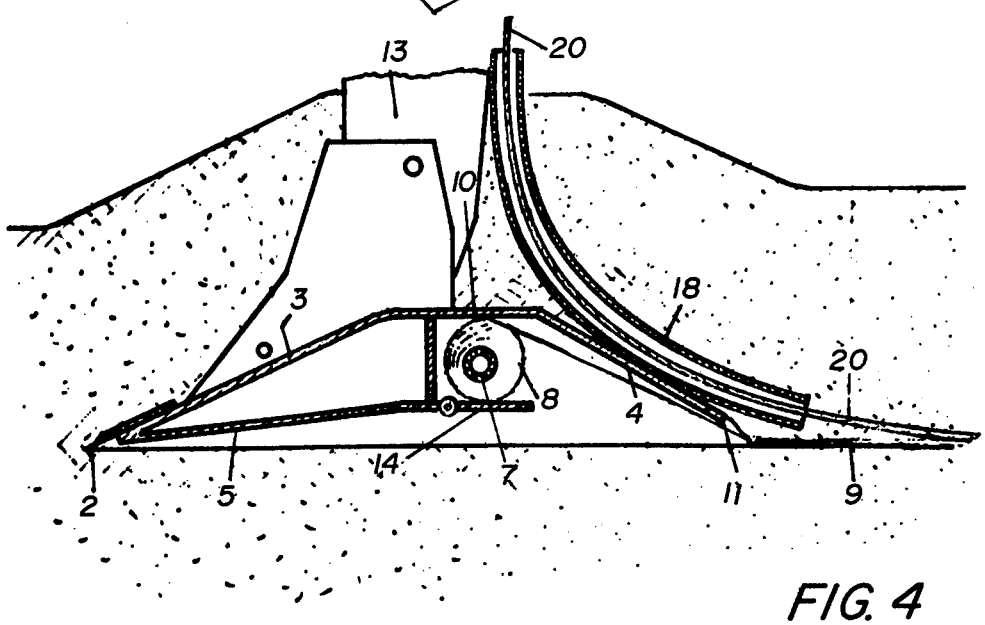
FIG. 4 is a cross-section through a blade together with equipment suitable for laying piping adjacent to the sheet membrane.
Figure 5A:
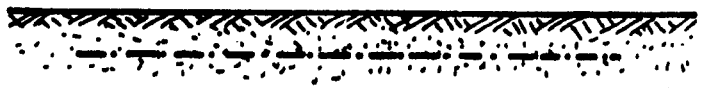
FIGS. 5A-5F illustrate respectively different ways of placing membranes by the method described.
Figure 5B:
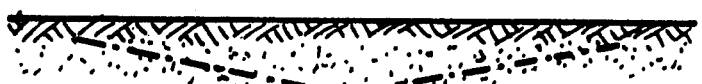
Figure 5C:
Figure 5D:
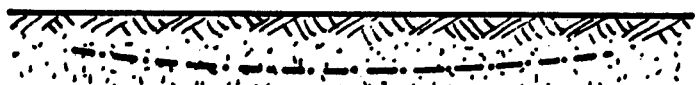
Figure 5E:
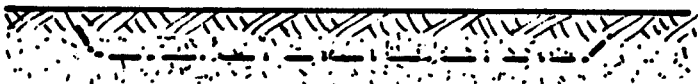
Figure 5F:
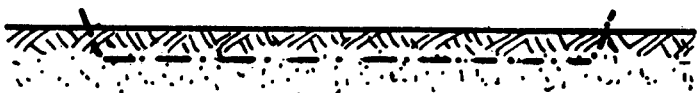

All pivots of the above-mentioned rollers 16 are secured in the walls of a special chamber which includes a tray 14 which hinged to the end shields 12 by simple hinges that allow it to drop below the whole structure to facilitate unloading and reloading of the rolls 8 of thin sheet material. When the try 14 is lifted to a working position, as shown in FIGS. 3 and 4, it is automatically locked there by free-falling hooks 15.

This arrangement is not essential but exemplifies a specific design that has been built and field tried for reliance and simplicity of operation.

Wider or narrower blades and film strips may be used, depending on the type of soil, specific use, tractor available, etc. Other dimensions of the implement may also be changed due to the end uses and well-known laws of soil mechanics.

Various modifications and alterations may be carried out to the implement and to the method by a person skilled in the art, however within the limits of the invention and the scope of the appended claims.

The underground laying of prefabricated films may be combined with underground spraying by means of the same tool in the same pass. Thus any liquid may be injected by spraying for different purposes, such as softening the ground, introducing fertilizer, fumigation or any other end use.

The tool edge may be implemented with special teeth, chisels and vibrating parts to reduce the necessary forces in some heavier soils or in soils with some cohesive strength.

The tool edge may be straight, slightly curved or V-shaped so that the cross-section of the finished membrane is straight, curved or V-shaped. This is necessary to obtain special effects, such as illustrated in FIGS. 5A–5E.

The implement is equipped with standard aids as are common in earthwork machines and agricutural machinery, but are not part of this invention. They are, for example, edge markers to aid in exact performance; depth indicators, depth wheels and/or automatic depth controlling sensors to indicate the flow of the unrolled film and even to assay its length.

Of special importance is the possible combination of prefabricated membrane and underground pipes, wires and/or cables. The techniques of laying underground pipes, wires and cables are well known. An implement is dragged through the soil while a pipe, a wire or a cable is unrolled through a special conduit in the implement straight into a mole hole which has been formed in the soil. The combination of a prefabricated membrane and such an underground pipe, wire and cable is of a unique advantage.

There may be regular pipes, perforated pipes, heat conducting pipes, stripped or insulated wires, cables and the like. The pipes may be laid below the membrane or above it. In the first case, the pipe, wire or cable is laid before the membrane is laid. In the second case, the pipe, wire or cable laying implement is a part of the main blade and the pipe, wire or cable is laid after the membrane. FIG. 4 shows such a combination. In addition to the equipment shown in FIG. 1 it contains a pipe conduit 18 through which the pipe or wire or cable 20 is fed.

The pipes, wires or cable may be laid at the seams between neighboring membrane strips. The invention thus includes the combination in one implement of both installations of prefabricated membrane and piping or wiring.

The above-mentioned implement is usually dragged through the soil by an appropriate tractor or any other vehicle that has the necessary drawbar pull for the specific blade in the specific soil. However, it may also be dragged by a vehicle specially built for the purpose in which the knife is not dragged behind, but is anchored underneath the vehicle in a form that allows various degrees of freedom such as depth, tilt, angle, etc. This last arrangement may be similar to motograder.

It will be obvious to those skilled in the art that various changes may be made without departing from the scope of the invention and the invention is not to be considered limited to what is shown in the drawings and described in the specification.

What is claimed is:

1. A method of laying subsoil membranes comprising the steps of:
    (a) dragging through the soil, at a predetermined depth, a hollow, cutting blade having an interior chamber, a leading cutting edge arranged transverse to direction of motion and upstream of said chamber, a front portion upwardly sloping from said leading cutting edge and a rear portion downstream from said chamber and downwardly sloping and having a rear edge, the rear edge no lower than the level of the cutting edge of the blade;
    (b) providing a roll of a prefabricated thin sheeting of a pliable material within the interior chamber of the blade, said roll being freely rotatable and mounted parallel to the rear edge; and
    (c) continuously feeding said sheeting from the roll of sheeting within the interior chamber of the blade through an opening extending underneath and along said rear edge, into the soil, where the sheet material is held in position between undisturbed subsoil and soil dropping onto its upper surface after having been raised by the passing blade.

2. A method of laying subsoil membranes according to claim 1, wherein the dragging step involves dragging a cutting blade having a straight cutting edge.

3. A method of laying subsoil membranes according to claim 1, wherein said dragging step is effected by dragging said blade through the soil by a tracked vehicle.

4. A method of laying subsoil membranes according to claim 1, wherein said dragging step is effected by dragging said blade by a tractor with the blade attached to a ripper's frame of the tractor.

5. A method of laying subsoil membranes according to claim 1, wherein the step of providing is constituted by providing as the sheeting material a membrane of polyethylene sheeting of a thickness of between 10 and 40 microns.

6. A method of laying subsoil membranes according to claim 1, wherein the step of providing a supply of thin sheeting is constituted by supplying said roll of pliable, thin material of a length commensurable with the interior width of the blade.

7. A method of laying subsoil according to claim 1, wherein the step of providing is constituted by providing said roll of the sheeting on a support protruding from both ends of the roll.

8. A method of laying subsoil membranes according to claim 1, including additionally laying of at least one additional member adjacent to the sheeting simultaneously with the laying of the sheeting.

9. A method according to claim 8, wherein the step of laying at least one additional member is the step of laying at least one pipe.

10. A method according to claim 8, wherein the step of laying at least one additional member is the step of laying at least one cable.

11. A method according to claim 8, wherein the step of laying at least one additional member is the step of laying at least one wire.

12. A method according to claim 8, wherein the step of laying at least one additional member is the step of laying at least one additional member in form of a strip.

13. A method of laying subsoil membranes according to claim 1, including additionally spraying of chemicals simultaneously with the laying of the sheeting.

14. A method of laying subsoil membranes according to claim 13, wherein said spraying step is effected by spraying the chemicals in liquid form.

15. A method of laying subsoil membranes according to claim 13, wherein said straying step is effected by spraying the chemicals in powdered form.

16. A hollow generally horizontal cutting blade for laying subsoil membranes, the blade comprising a leading cutting edge, a trailing rear edge, an upper section extending between said leading and trailing edges and in the shape of an upwardly sloping front portion and a downwardly sloping rear portion connected by a substantially horizontal center portion, two side shields and a bottom portion sloping slightly in upward direction from its front adjacent said cutting edge so as to form a release angle behind said cutting edge, this bottom portion terminating short of said rear edge and forming an opening for feeding thin pliable sheet material into the subsoil, a chamber between said upper section and said bottom portion for containing a continuous supply of the thin pliable sheet material, and means in said chamber for holding the continuous supply of pliable sheet material and releasing the sheet material continuously as said cutting blade moves through the soil.

17. A hollow cutting blade according to claim 16, wherein said cutting edge and said rear edge are substantially straight and substantially parallel to one another.

18. A hollow cutting blade according to claim 16, wherein the cutting edge, the bottom portion and the rear edge are in shape of an obtuse angle as seen in direction of travel, having its apex substantially at a center between said two end shields at a lowermost point with two sides of the angle sloping in symmetrical and upward direction to two uppermost points near outer ends of the blade.

19. A hollow cutting blade according to claim 16, wherein the cutting edge, the bottom and the rear edge are in the shape of an obtuse angle as seen in direction of travel, having its apex substantially at a center between said two end shields at an uppermost point, with two sides of the angle sloping in symmetrical and downard direction to two lowermost points near the outer ends of the blade.

20. A hollow cutting blade according to claim 16, wherein said cutting edge, the bottom and the rear edge are concave as viewed in direction of travel.

21. A hollow cutting blade according to claim 16, wherein said means holding and releasing the sheet material includes at least two spaced, freely rotating rollers for supporting a roll of pliable membrane material whithin the blade.

22. A hollow cutting blade according to claim 21, including a tray means, and wherein the roll of pliable membrane material is supported by said tray, said rollers being hingedly supported on said end shields.

23. A device for laying a subsoil membrane comprising a transversally elongated cutting blade, said blade having an interior chamber, a leading cutting edge upstream of said interior chamber, a rear portion downstream from said interior chamber, and upper wall means extending in an upwardly sloping manner from said leading edge toward the location of said interior chamber and then downwardly from the location of said interior chamber to said rear portion, the rear portion of said cutting blade being no lower than the level of said leading cutting edge; and rotatable roller means within said interior chamber for supporting a roll of thin, pliable membrane material within the interior chamber of said blade and for releasing the pliable membrane material continuously as the blade moves through the soil.

* * * * *